United States Patent
Tan et al.

(10) Patent No.: US 10,528,413 B2
(45) Date of Patent: Jan. 7, 2020

(54) CRITICALITY-BASED ERROR DETECTION

(71) Applicant: Intel Corporation, Santa Clara, CA (US)

(72) Inventors: Jun Pin Tan, Kepong (MY); Kiun Kiet Jong, Pulau Pinang (MY)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 15/477,859

(22) Filed: Apr. 3, 2017

(65) Prior Publication Data

US 2018/0285190 A1 Oct. 4, 2018

(51) Int. Cl.
*G06F 11/00* (2006.01)
*G06F 11/07* (2006.01)
*G06F 17/50* (2006.01)

(52) U.S. Cl.
CPC ........ *G06F 11/0781* (2013.01); *G06F 11/073* (2013.01); *G06F 11/079* (2013.01); *G06F 11/0751* (2013.01); *G06F 17/504* (2013.01); *G06F 17/505* (2013.01)

(58) Field of Classification Search
CPC ............. G06F 11/0751; G06F 11/0766; G06F 11/0769; G06F 11/0772; G06F 11/0775; G06F 11/0778; G06F 11/0781; G06F 11/0784; G06F 11/0787; G06F 11/08; G06F 11/14; G06F 11/1479; G06F 11/16; G06F 11/22
USPC ......................................................... 714/48
See application file for complete search history.

(56) References Cited

U.S. PATENT DOCUMENTS

| | | | |
|---|---|---|---|
| 4,672,537 A | 6/1987 | Katzman et al. | |
| 7,028,290 B2 | 4/2006 | Srivastava et al. | |
| 7,987,332 B2* | 7/2011 | Traister | G11C 16/10 711/167 |
| 2005/0169083 A1* | 8/2005 | Riho | G06F 11/1004 365/222 |

(Continued)

OTHER PUBLICATIONS

Altera, "Advanced SEU Detection IP Core Users Guide", Oct. 31, 2016, 26 pages, retrieved from the Internet: (https://www.altera.com/en_US/pdfs/literature/ug/ug_altadvseu.pdf>.

(Continued)

*Primary Examiner* — Sarai E Butler
(74) *Attorney, Agent, or Firm* — Treyz Law Group, P.C.; Tianyi He; Jason Tsai

(57) ABSTRACT

A prioritized error detection schedule may be generated using computer-aided-design (CAD) tools that receive specifications of critical regions within an array of configuration random access memory (CRAM) cells on an integrated circuit. Each of the specified critical regions may be provided a respective criticality weight. The proportion of indices in a prioritized error detection schedule that prescribe error detection for a given critical region may be based on the criticality weight of the given critical region. A prioritized error detection schedule may prescribe more frequent error correction for critical regions with higher criticality weights relative to critical regions with lower criticality weights. Addressing circuitry on the integrated circuit may be used to read out data from critical regions of CRAM in the order prescribed by the prioritized error detection schedule and check the read out CRAM data for errors.

20 Claims, 11 Drawing Sheets

(56) References Cited

U.S. PATENT DOCUMENTS

2014/0201579 A1* 7/2014 Arsovski ............... G11C 29/56
                                                                         714/719

OTHER PUBLICATIONS

Le, "Soft Error Mitigation Using Prioritized Essential Bits", Application Note: Virtex-6 and 7 Series FPGAs, Xilinx, XAPP538, vol. 1.0, Apr. 4, 2012, 11 pages, retrieved from the Internet: <http://www.xilinx.com/support/documentation/application_notes/xapp538-soft-error-mitigation-essential-bits.pdf>.

Atsatt et al., U.S. Appl. No. 15/338,074, filed Oct. 28, 2016.

* cited by examiner

*700*

| BASIC PRIORITIZED SEU DETECTION SCHEDULE ||
| INDEX | REGION TO PERFORM SEU DETECTION IN |
| --- | --- |
| 1 | CRITICAL REGION 1 |
| 2 | CRITICAL REGION 1 |
| ... | ... |
| $W_1$ | CRITICAL REGION 1 |
| $W_1+1$ | CRITICAL REGION 2 |
| $W_1+2$ | CRITICAL REGION 2 |
| ... | ... |
| $W_1+W_2$ | CRITICAL REGION 2 |
| $W_1+W_2+1$ | CRITICAL REGION 3 |
| $W_1+W_2+2$ | CRITICAL REGION 3 |
| ... | ... |
| $W_1+W_2+W_3$ | CRITICAL REGION 3 |
| $W_1+W_2+W_3+1$ | NON-CRITICAL REGION |
| ... | ... |
| $W_1+W_2+W_3+W_0$ | NON-CRITICAL REGION |

| EXEMPLARY INTERLEAVING OF SEU DETECTION SCHEDULE $W_0=1, W_1=100, W_2=60, W_3=20$ ||
|---|---|
| INDEX | REGION TO PERFORM SEU DETECTION IN |
| 1-50 | CRITICAL REGION 1 |
| 51-80 | CRITICAL REGION 2 |
| 81-90 | CRITICAL REGION 3 |
| 91-140 | CRITICAL REGION 1 |
| 141-170 | CRITICAL REGION 2 |
| 171-180 | CRITICAL REGION 3 |
| 181 | NON-CRITICAL REGION |

FIG. 8

CRITICALITY-BASED ERROR DETECTION

BACKGROUND

This invention relates to devices and methods for generating prioritized error-detection schedules for integrated circuits having memory, and more particularly, to adjusting the error checking frequency of memory based on adjustable region-specific criticality weights.

Programmable integrated circuits are a type of integrated circuit that can be programmed by a user to implement a desired custom logic function. Logic functions implemented on a programmable integrated circuit may be used to perform a variety of tasks that have varying degrees of criticality or importance to the overall functioning of the integrated circuit. It may be desirable to check memory regions used to configure critical logic functions more frequently than memory regions used to configure non-critical logic functions.

Configuration random access memory (CRAM) in the programmable integrated circuit are used to store configuration data to implement user logic functions. Logical values stored in the CRAM are used to configure circuits in the programmable integrated circuit that perform different functions within the device. These different functions may have respective levels of criticality. Consequently, the memory cells used to program these circuits may have different respective levels of criticality to the functioning of the programmable integrated circuit device.

Conventional programmable circuits scan CRAM cells for errors uniformly, checking each cell within the CRAM for errors with a common frequency or at a single rate. However, this error detection scheme may result in sub-optimal performance of the integrated circuit, as the circuitry used to implement critical logic functions (where errors are relatively less tolerable) is checked with the same frequency as circuitry used to implement non-critical logic functions (where errors are relatively more tolerable).

CRAM cells are susceptible to single event upsets (SEUs) that cause bit-flips in the CRAM cells. SEUs are sometimes referred to as "soft errors" because they are not permanent faults (or, "hard" errors) and can be reversed (by re-writing a correct value into the affected memory cell). When one or more CRAM cells experience bit-flips due to SEUs, the errors in the CRAM can become harder to detect and correct. Moreover, the longer a system takes to detect and correct a SEU, the likelihood of the error adversely affecting system operation or leading to faulty/erroneous operation of device resources increases. For this reason, it is desirable to perform error detection operations on regions of a CRAM array that configure critical circuitry frequently.

Conventional CRAM arrays undergo error detection in a uniform manner, with each CRAM cell being checked for errors at a common frequency. As an example, if a programmable integrated circuit has the ability to detect errors in a row of CRAM bits at a time, if it takes 100 nanoseconds (ns) to check each row, and if a CRAM array has 100,000 rows, then each bit in the CRAM array will be checked every 10 million ns or 10 milliseconds (ms) in a conventional arrangement. In certain applications, however, an error in CRAM cells that configure critical logic functions that persists for over 5 ms, 2 ms, or even 1 ms may result in unacceptable performance degradation or even failure.

Therefore, improved methods for providing error detection capabilities to integrated circuits with arrays of memory cells are required.

SUMMARY

An array of CRAM cells may be provided on an integrated circuit. CRAM cells, or generally, portions/regions of the array of CRAM cells may be used to configure different user defined logic functions or different device resource types. Examples of different device resource types may include control circuitry, user logic datapath circuitry, or statistics circuitry. Any number of device resource types may be configured using a respective subset of the array of CRAM cells. As an example, a first device resource type (such as control circuitry) may be configured using a first subset of the array of CRAM cells, while a second device resource type (such as datapath circuitry) may be configured using a second subset of the array of CRAM cells.

Because the different device resource groups of an integrated circuit have different levels of criticality (with respect to how essential their proper functioning is to the overall functionality of the integrated circuit), different subsets of the array of CRAM cells may also have different levels of criticality. A method is provided for receiving, with computer-aided-design (CAD) tools, a designation of one or more critical regions in an integrated circuit floorplan. The received designation of the critical region may be a graphical designation received from a user who graphically selects a portion of a CRAM array from a floorplan view of the integrated circuit. The received designation of the critical region may also be a numerical specification of rows and columns spanned by the critical region.

For each of the designated critical regions, CAD tools may also receive an associated criticality weight. The criticality weight may represent the degree to which the critical region is responsible for proper functionality of the integrated circuit. The criticality weight may be set to any desired value. Alternatively, a criticality weight may be assigned to a critical region based on a received rank designation. The criticality weight assigned to any given critical region may determine the amount of times that error detection for the given critical region is prescribed in a prioritized error detection schedule.

A basic prioritized error detection schedule may be created by creating an indexed list having a number of indices equal to the sum of all of the criticality weights for the designated critical regions and the criticality weight for a non-critical region of the integrated circuit. A number of sequential indices of the basic prioritized error detection schedule may be associated with, or prescribe error detection for, a given critical region. The number of sequential indices of the basic prioritized error detection schedule associated with the given critical region may be equal to the criticality weight for the given critical region. Interleaving may be performed on a basic prioritized error detection schedule.

An integrated circuit may receive a prioritized error detection schedule at a configuration control block. Addressing circuitry may be used to sequentially traverse the indices of the received prioritized error detection schedule and read the CRAM cells contained within the critical regions associated with the indices in the prescribed order. The read out CRAM data may be checked for errors by any suitable error detection scheme.

BRIEF DESCRIPTION OF THE DRAWINGS

FIG. 7 is a table illustrating an exemplary basic prioritized error detection schedule in accordance with an embodiment.

FIG. 8 is a table illustrating an exemplary interleaved version of a basic prioritized error detection schedule in accordance with an embodiment.

DETAILED DESCRIPTION

Embodiments of the present invention relate to error detection circuitry and control circuitry and methods for error detection circuitry provided to random access memory (RAM) cells in an integrated circuit (specifically, configuration RAM or CRAM). The integrated circuit may implement various user logic functions in programmable logic fabric, or may include hardened circuitry (examples of hardened circuitry include IP blocks) that is relatively less programmable than the logic fabric to implement other logic functions.

In some scenarios, a first CRAM cell can provide a configuration bit to circuitry that is critical to the operation of the integrated circuit and a second CRAM cell can provide another configuration bit to circuitry that is not as critical (or that is not critical) to the operation of the integrated circuit. In such scenarios, it may be desirable to check the first CRAM cell for errors more frequently than the second CRAM cell. Detectable errors may include single bit errors and double adjacent-bit errors. It may be desirable to check CRAM cells in smaller partitions or sub-arrays so that the number of detectable errors can be increased.

As an example, an integrated circuit may include multiple device resource groups. Without limiting the scope of the present invention, these device resource groups may include control circuitry, datapath circuitry, user logic circuitry, statistics circuitry, and supervisor/orchestration circuitry. Certain device resource groups may be configured by CRAM cells bound within respective sub-regions of a CRAM array. As an example, a first sub-region of a CRAM array may be used to configure control circuitry (or more generally, a first device resource group having a high criticality) and a second sub-region of a CRAM array may be used to configure user logic circuitry (or more generally, a second device resource group having a relatively lower criticality than the first).

In the above example, a prioritized error detection schedule that prescribes more frequent error detection in the first sub-region of the CRAM array relative to the second sub-region of the CRAM array may be created and used by the integrated circuit. The frequency with which the first and second sub-regions of the CRAM array are checked for errors may be determined by received user inputs to computer-aided-design (CAD) software, or automatically generated by the CAD software based on contextual indications of criticality levels of the sub-regions in the CRAM array.

Figure 1:
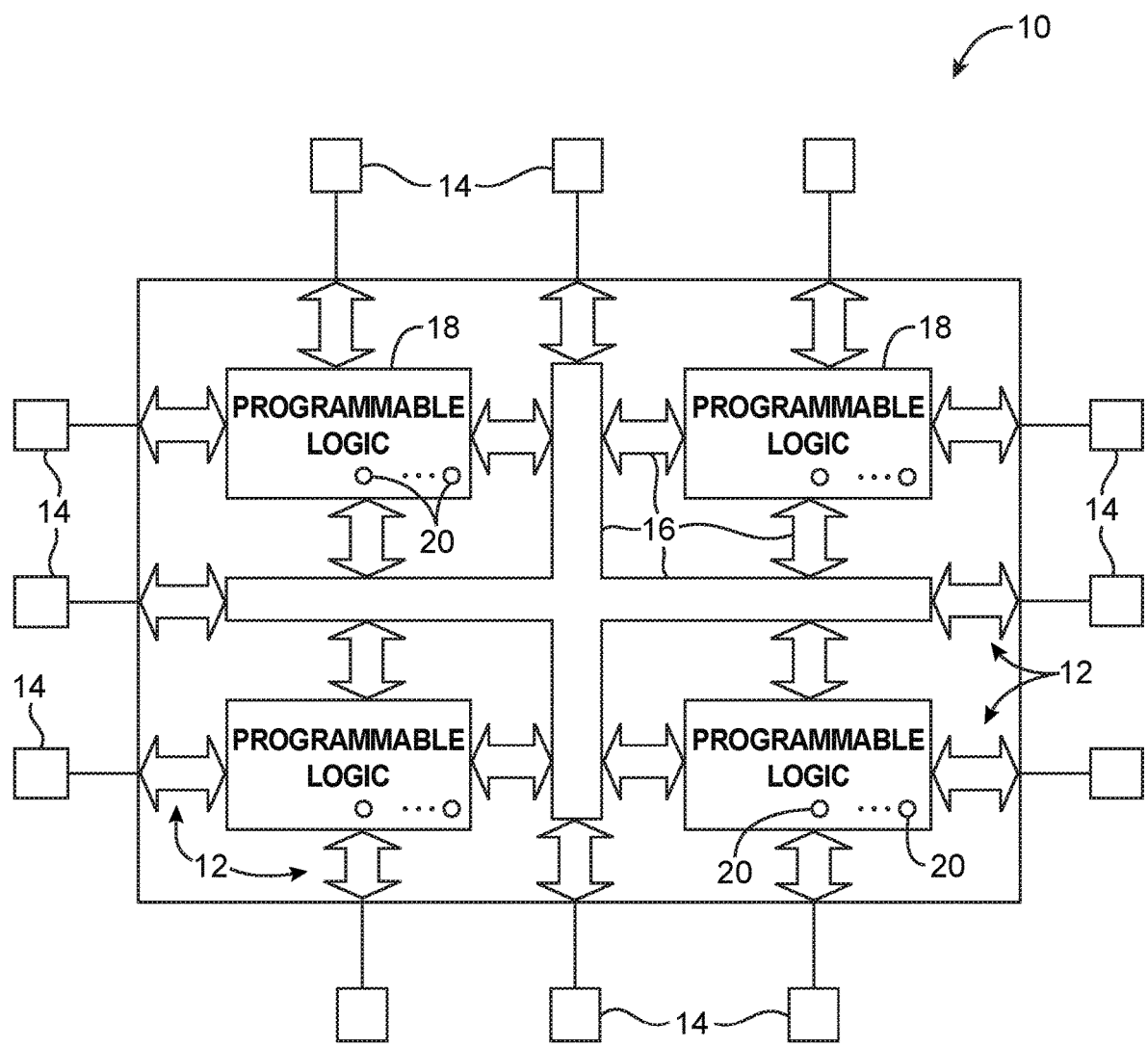
FIG. 1 is a diagram of an illustrative programmable integrated circuit that implements custom logic functions based on configuration random access memory (CRAM) settings in accordance with an embodiment.

FIG. 1 is a diagram of an illustrative programmable integrated circuit device. As shown in FIG. 1, device 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. For example, programmable logic 18 may include look-up tables, registers, and multiplexers. Programmable logic 18 may also include embedded RAM blocks of varying sizes, embedded ASIC blocks such as programmable multipliers, arithmetic blocks or video processing, and embedded processors. The programmable logic 18 may be configured to perform a custom logic function. The programmable interconnects associated with interconnection resources may be considered to be a part of programmable logic 18.

Programmable logic 18 contains programmable elements 20. Programmable elements 20 may be based on any suitable programmable technology, such as fuses, antifuses, electrically-programmable read-only-memory technology, random-access memory cells, mask-programmed elements, etc. As an example, programmable elements 20 may be formed from memory cells. During programming, configuration data is loaded into the memory cells using pins 14 and input-output circuitry 12. The memory cells are typically random-access-memory (RAM) cells. Because the RAM cells are loaded with configuration data, they are sometimes referred to as configuration RAM cells (CRAM).

Programmable element 20 may be used to provide a static control output signal for controlling the state of an associated logic component in programmable logic 18. The output signals generated by elements 20 are often applied to gates of metal-oxide-semiconductor (MOS) transistors (sometimes referred to as pass gate transistors). This example is merely illustrative. If desired, programmable elements 20 may be used to provide static output signals for configuring any desired circuitry on device 10.

The circuitry of device 10 may be organized using any suitable architecture. As an example, logic 18 of programmable device 10 may be organized in a series of rows and columns of larger programmable logic regions, each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Other device arrangements may use logic that is not arranged in rows and columns.

Figure 2:
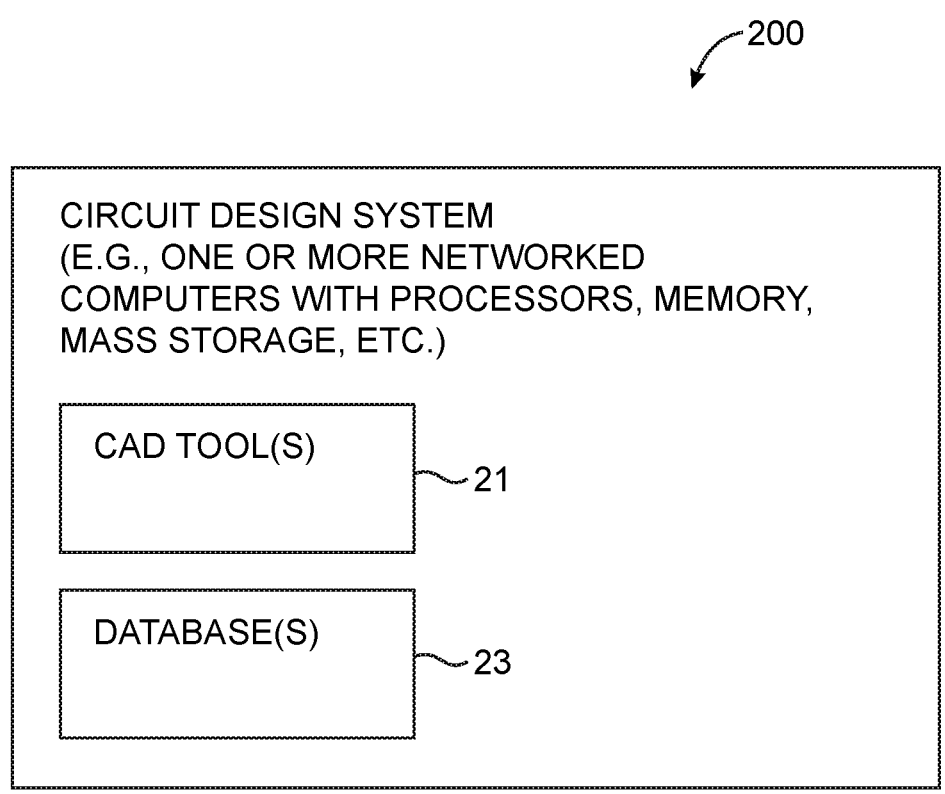
FIG. 2 is a diagram of a circuit design system that may be used to design integrated circuits in accordance with an embodiment.

An illustrative circuit design system 200 for designing the circuitry of device 10 in accordance with the present invention is shown in FIG. 2. System 200 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 21 and databases 23 reside on system 200. During operation, executable software such as the software of computer aided design tools 21 runs on the processor(s) of system 200. Databases 23 are used to store data for the operation of system 200. In general, software and data may be stored on any computer-readable medium (storage) in system 200. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 200 is installed, the storage of system 200 has instructions and data that cause the computing equipment in system 200 to execute various methods (processes). When performing these processes, the computing equipment is configured to implement the functions of the circuit design system.

The computer aided design (CAD) tools 21, some or all of which are sometimes referred to collectively as a CAD tool or an electronic design automation (EDA) tool, may be provided by a single vendor or by multiple vendors. Tools 21 may be provided as one or more suites of tools (e.g., a compiler suite for performing tasks associated with implementing a circuit design in a programmable logic device) and/or as one or more separate software components (tools). Database(s) 23 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 3:
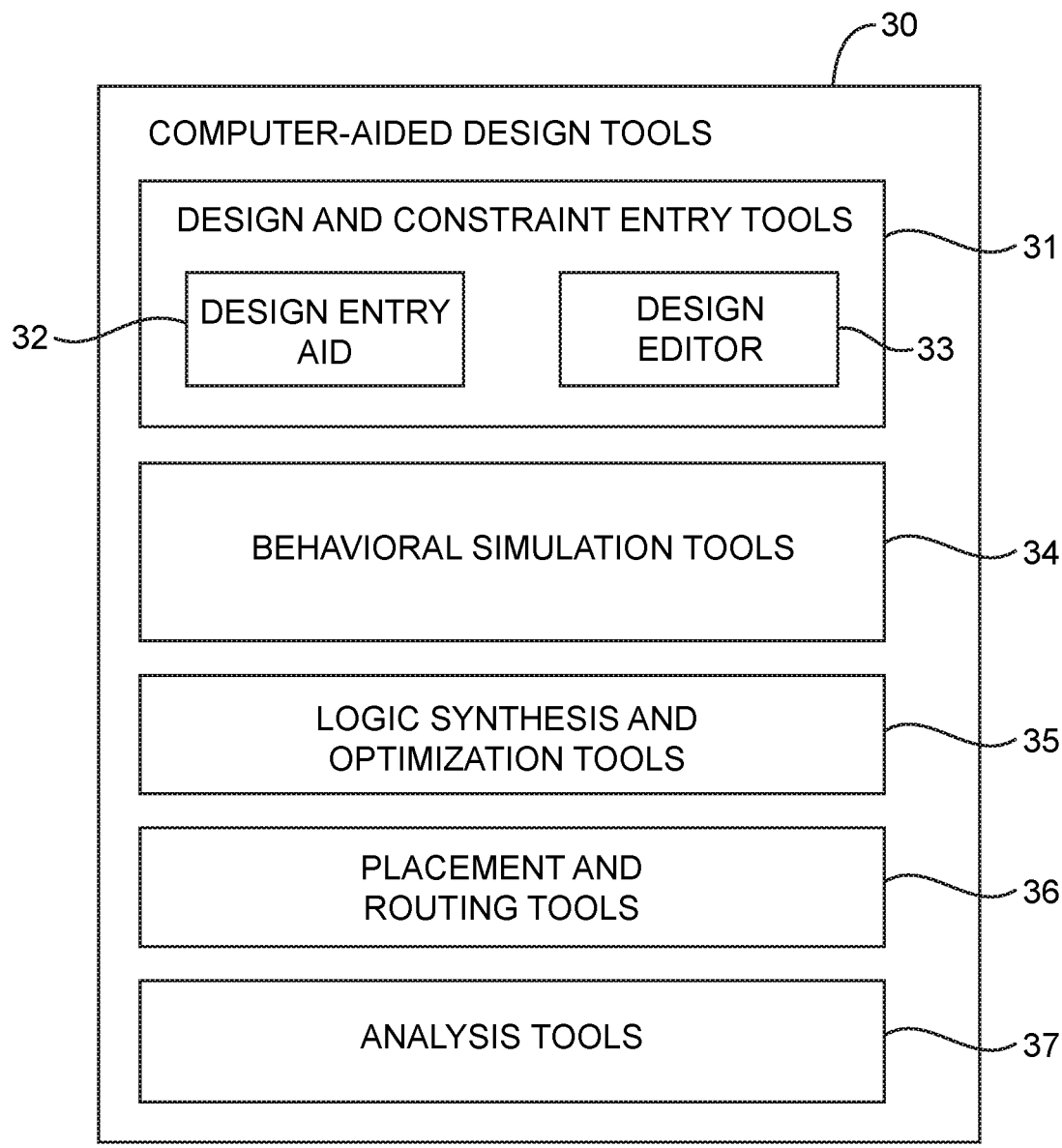
FIG. 3 is a diagram of illustrative computer-aided design (CAD) tools that may be used in a circuit design system in accordance with an embodiment.

Illustrative computer aided design tools 30 that may be used in a circuit design system such as circuit design system 200 of FIG. 2 are shown in FIG. 3.

The design process may start with the formulation of functional specifications of the integrated circuit design (e.g., a functional or behavioral description of the integrated circuit design). A circuit designer may specify the functional operation of a desired circuit design using design and constraint entry tools 31. Design and constraint entry tools 31 may include tools such as design and constraint entry aid 32 and design editor 33. Design and constraint entry aids such as aid 32 may be used to help a circuit designer locate a desired design from a library of existing circuit designs and may provide computer-aided assistance to the circuit designer for entering (specifying) the desired circuit design.

As an example, design and constraint entry aid 32 may be used to present screens of options for a user. The user may click on on-screen options to select whether the circuit being designed should have certain features. Design editor 33 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 31 may be used to allow a circuit designer to provide a desired circuit design using any suitable format. For example, design and constraint entry tools 31 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 31 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 31 may allow the circuit designer to provide a circuit design to the circuit design system 200 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 33. Blocks of code may be imported from user-maintained or commercial libraries if desired.

After the design has been entered using design and constraint entry tools 31, behavioral simulation tools 34 may be used to simulate the functional performance of the circuit design. If the functional performance of the design is incomplete or incorrect, the circuit designer can make changes to the circuit design using design and constraint entry tools 31. The functional operation of the new circuit design may be verified using behavioral simulation tools 34 before synthesis operations have been performed using tools 35. Simulation tools such as behavioral simulation tools 34 may also be used at other stages in the design flow if desired (e.g., after logic synthesis). The output of the behavioral simulation tools 34 may be provided to the circuit designer in any suitable format (e.g., truth tables, timing diagrams, etc.).

Once the functional operation of the circuit design has been determined to be satisfactory, logic synthesis and optimization tools 35 may generate a gate-level netlist of the circuit design, for example using gates from a particular library pertaining to a targeted process supported by a foundry, which has been selected to produce the integrated circuit. Alternatively, logic synthesis and optimization tools 35 may generate a gate-level netlist of the circuit design using gates of a targeted programmable logic device (i.e., in the logic and interconnect resources of a particular programmable logic device product or product family).

Logic synthesis and optimization tools 35 may optimize the design by making appropriate selections of hardware to implement different logic functions in the circuit design based on the circuit design data and constraint data entered by the logic designer using tools 31.

After logic synthesis and optimization using tools 35, the circuit design system may use tools such as placement and routing tools 36 to perform physical design steps (layout synthesis operations). Placement and routing tools 36 are used to determine where to place each gate of the gate-level netlist produced by tools 35. For example, if two counters interact with each other, the placement and routing tools 36 may locate these counters in adjacent regions to reduce interconnect delays or to satisfy timing requirements specifying the maximum permitted interconnect delay. The placement and routing tools 36 create orderly and efficient implementations of circuit designs for any targeted integrated circuit (e.g., for a given programmable integrated circuit such as a field-programmable gate array (FPGA)).

Tools such as tools 35 and 36 may be part of a compiler suite (e.g., part of a suite of compiler tools provided by a programmable logic device vendor). In accordance with the present invention, tools such as tools 35, 36, and 37 may also include timing analysis tools such as timing estimators. This allows tools 35 and 36 to satisfy performance requirements (e.g., timing requirements) before actually producing the integrated circuit. As an example, tools 35 and 36 may partition data paths into subsets of data paths and instantiate additional cascaded processing and storage circuitry for each newly created subset of data paths. If desired, tools 35 and 36 may register pipeline selected paths in order to provide for higher clock rates in exchange for increased latency.

After an implementation of the desired circuit design has been generated using placement and routing tools 36 the implementation of the design may be analyzed and tested using analysis tools 37. After satisfactory optimization operations have been completed using tools 30 and depending on the targeted integrated circuit technology, tools 30 may produce a mask-level layout description of the integrated circuit or configuration data for programming the programmable logic device.

Prioritization of certain sub-regions of a CRAM array in an integrated circuit for error detection purposes may be performed using the behavior simulation tools 34 (i.e., after the functional verification of an integrated circuit design has been completed) or using the analysis tools 37 (i.e., after the implementation has been completed).

Figure 4:
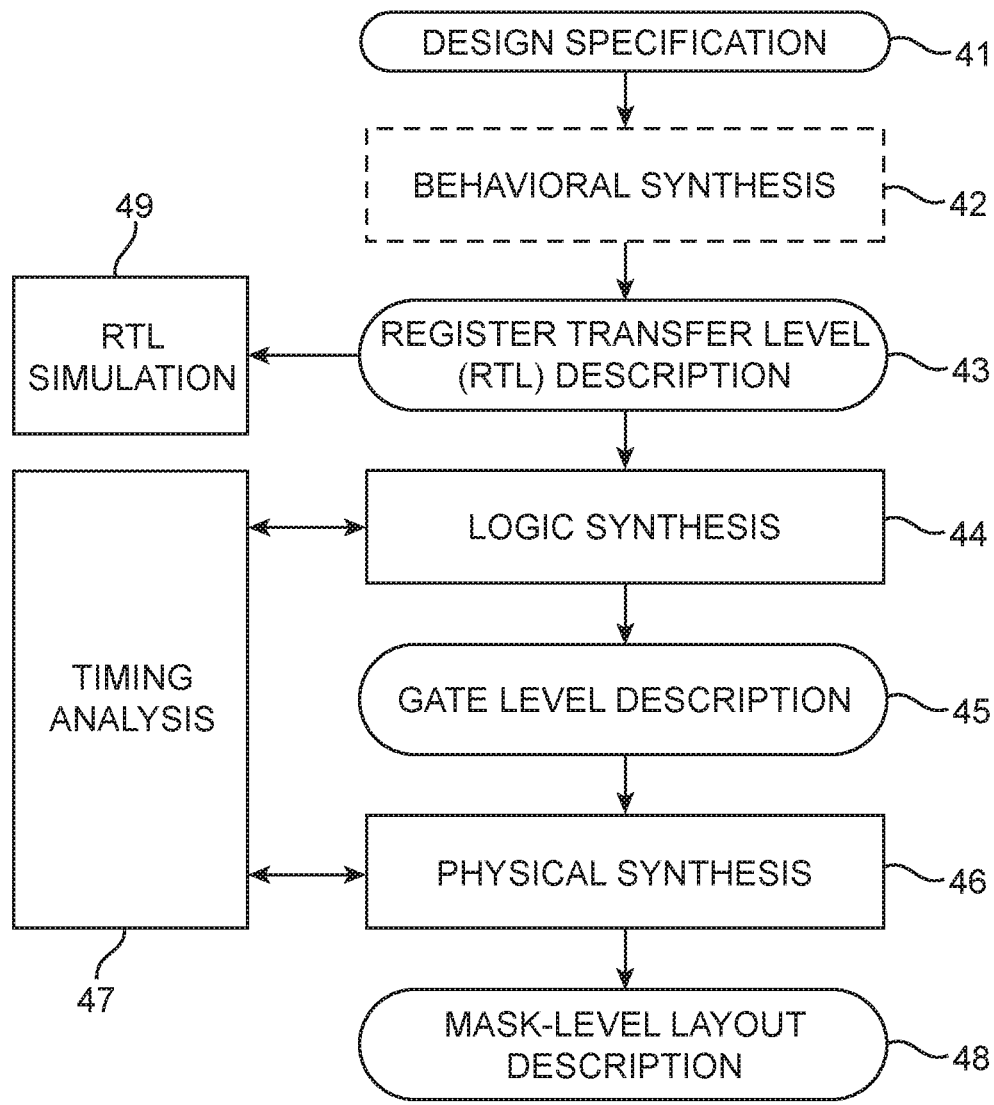
FIG. 4 is a flow chart of illustrative steps for designing an integrated circuit in accordance with an embodiment in accordance with an embodiment.

Illustrative operations involved in using tools 30 of FIG. 3 to produce the mask-level layout description of the integrated circuit are shown in FIG. 4.

As shown in FIG. 4, a circuit designer may first provide a design specification 41. The design specification 41 may, in general, be a behavioral description provided in the form of an application code (e.g., C code, C++ code, SystemC code, OpenCL code, etc.). In some scenarios, the design specification may be provided in the form of a register transfer level (RTL) description 43. The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). Alternatively, the RTL description may be provided as a schematic representation.

In general, the behavioral design specification 41 may include untimed or partially timed functional code (i.e., the application code does not describe cycle-by-cycle hardware behavior), whereas the RTL description 43 may include a fully timed design description that details the cycle-by-cycle behavior of the circuit at the register transfer level.

In certain embodiments, design specification 41 or RTL description 43 may include optimization constraints such as an upper number of subsets into which a data path may be partitioned for the purpose of limiting the creation of cascaded processing and storage circuits.

Design specification 41 or RTL description 43 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 41, the RTL description 43 (e.g., as a pragma or as an assertion), in a constraint file, or through user input (e.g., using the design and constraint entry tools 31 of FIG. 3), to name a few. In certain embodiments, a given data path may have more than one constraint associated with the path, and some of these constraints may be in conflict with each other (e.g., a constraint received with the behavioral design specification for a given path may conflict with the constraint received with the RTL description and with a constraint received with a constraint file). In this scenario, a predetermined priority of constraints, which may be defined explicitly or resolved implicitly by CAD tools 30, may determine which of the conflicting constraints is selected. For example, the constraint from the user or a configuration file may override the constraints received from other sources, and a constraint received with the RTL description may override a constraint received with the behavioral design specification.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools 30. For example, a constraint defined at a higher level of the design hierarchy may override a constraint at a lower level. Alternatively, a constraint defined at a lower level of the design hierarchy may override a constraint at a higher level, or individual levels of the design hierarchy may be given priority over other levels of design hierarchy.

Constraints included in design specification 41 or RTL description 43 may be conveyed to CAD tools 30 in the form of variables, parameters, compiler directives, macros, pragmas, or assertions, just to name a few. CAD tools 30 may use a constraint file, which may include a portion or all of the constraints. Such a constraint file may be included with design specification 41 or RTL description 43. In some scenarios, a portion or all of the constraints may be embedded in the circuit design. Alternatively, the constraints may have been defined using the design and constraint entry tools 31 (see FIG. 3).

At step 42, behavioral synthesis (sometimes also referred to as algorithmic synthesis) may be performed to convert the behavioral description into an RTL description 43. Behavioral synthesis may evaluate data path implementations for each of the data paths with read-modify-write operations in the behavioral design specification. Each data path evaluation may be followed by the partitioning of the data path into data path subsets and the instantiation of corresponding cascaded processing and storage circuits as illustrated in FIGS. 2 and 3. Step 42 may be skipped if the design specification is already provided in form of an RTL description.

At step 49, behavioral simulation tools 34 may perform an RTL simulation of the RTL description, which may verify the functional performance of the RTL description. If the functional performance of the RTL description is incomplete or incorrect, the circuit designer can make changes to the HDL code (as an example). During RTL simulation 49, actual results obtained from simulating the behavior of the RTL description may be compared with expected results.

During step 44, logic synthesis operations may generate gate-level description 45 using logic synthesis and optimization tools 35 from FIG. 3. If desired, logic synthesis operations may add or remove data path subsets and the corresponding cascaded processing and storage circuitry together with the corresponding pipeline registers as illustrated in FIGS. 2 and 3 according to the constraints that are included in design specification 41 or RTL description 43.

During step 46, physical synthesis operations (e.g., place and route and optimization operations using for example placement and routing tools 36) may place and connect the different gates in gate-level description 45 in a preferred location on the targeted integrated circuit to meet given target criteria (e.g., minimize area and maximize routing efficiency or minimize path delay and maximize clock frequency or any combination thereof). Physical synthesis operation may add or remove data path subsets and the corresponding cascaded processing and storage circuitry together with the corresponding pipeline registers as illustrated in FIGS. 2 and 3 according to the constraints that are included in design specification 41 or RTL description 43. The output of physical synthesis 46 is a mask-level layout description 48.

Prioritization of certain sub-regions of a CRAM array in an integrated circuit for error detection purposes may be performed at the stage of logic synthesis 44, generation of the gate level description 45 or at the physical synthesis step 46.

Circuit design system 400 may include timing estimator 47 (e.g., formed as part of optimization tools 35, tools 36, or tools 37) that may be used to estimate delays between synchronous elements of the circuit design. For example, timing estimator 47 may estimate delays between sequential elements such as registers and storage circuits (e.g., based on the lengths of interconnects, intermediate combinational logic, etc.). The delays may, if desired, be estimated based on metrics such as slack (e.g., the difference between a required arrival time and the arrival time of a signal), slack-ratios, interconnect congestion, or other timing metrics. Circuit design system 400 may use the estimated delays to determine the locations of groups of circuitry while helping to ensure that delays satisfy timing requirements (e.g., critical path delay requirements) or other performance constraints. An example of another performance constraint is a dynamic power dissipation constraint.

Timing estimator 47 may be configured to produce estimated delays. For example, timing estimator 47 may determine that a path is associated with a delay that is larger than the target delay specified for the path as one of the target criteria. Timing estimator 47 may detect that the given path has a larger delay before, during, and after logic synthesis 44 or before, during, and after physical synthesis 46, which may include operations such as clustering, partitioning, placement, and routing, just to name a few. In this scenario, logic synthesis 44 or physical synthesis 46 may increase the number of data path subsets, thereby reducing the width of each individual data path subset and potentially improving the performance of the given path.

Similarly, consider that the given path meets all target criteria with a large margin. For example, timing estimator 47 may determine that a given path has a delay that is smaller than the target delay specified for the path as one of the target criteria.

If the estimated delays produced by timing estimator 47 indicate that a given path has failed to meet its associated timing constraint, a designer may choose to impose additional location assignment and region constraints on placement and routing tools 36 or include these constraints to those that are included in design specification 41 or RTL description 43. Imposing multiple region constraints is prone to error. Even if region constraints are imposed properly and force two nodes closer together to meet a timing constraint, the addition of multiple region constraints can adversely influence the performance the implementation. The addition of extra constraints to the placement and routing tools 36, design specification 41, or RTL description 43 may cause unnecessarily increase the complexity of physical synthesis step 46.

Figure 5:
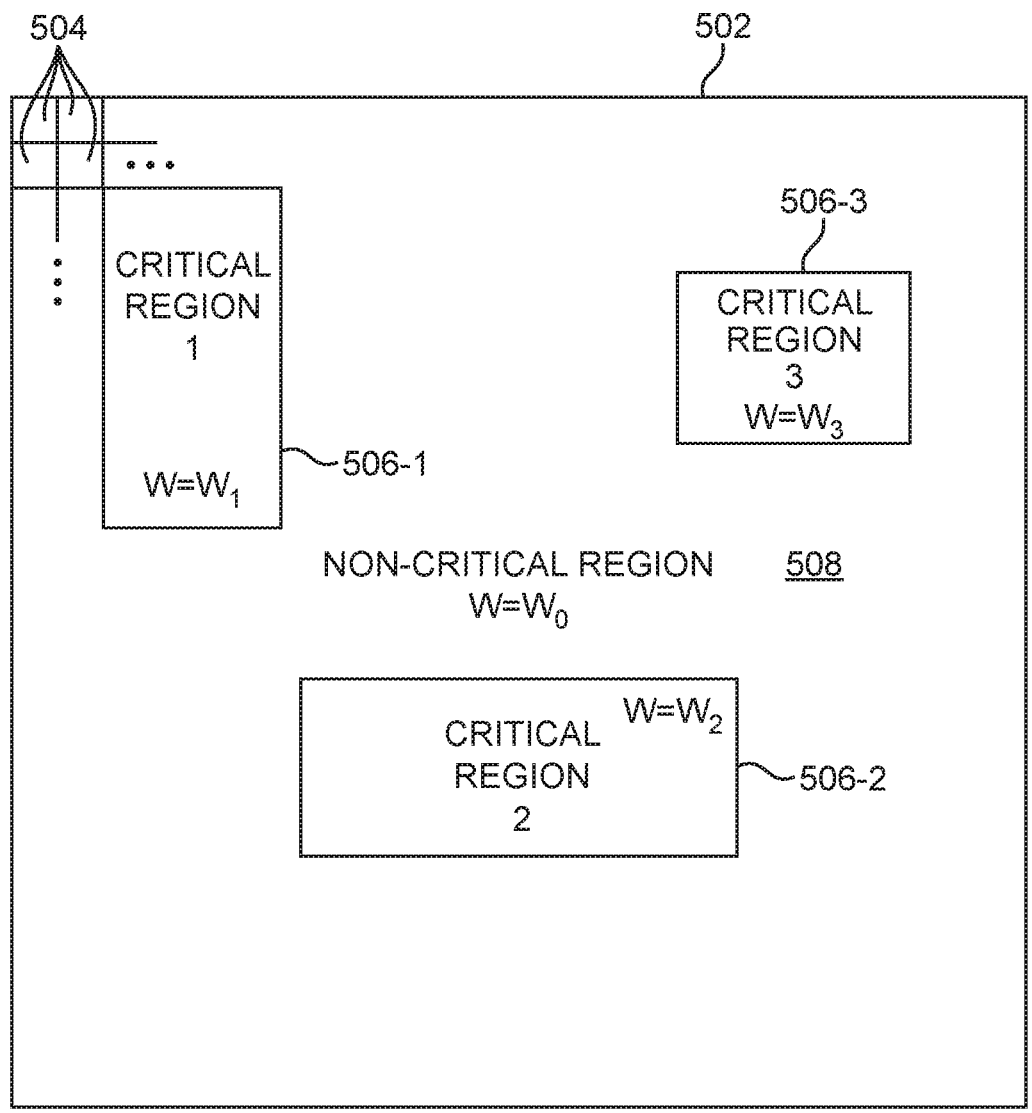
FIG. 5 illustrates a graphical user interface in a computer-aided-design (CAD) software that visualizes an integrated circuit floorplan and associated criticality weights/levels in accordance with an embodiment.

FIG. 5 illustrates a graphical user interface in a computer-aided-design (CAD) software that visualizes an integrated circuit floorplan and associated criticality weights/levels in accordance with an embodiment. The user interface view 500 may feature an integrated circuit floorplan 502 that resolves detail down to a CRAM unit 504 in an array of CRAM cells. Such an array of CRAM cells may include elements 20 that are used to configure circuitry in both high and low priority logical functions.

As an example, a first CRAM unit 504 may be used to configure the control or orchestration circuitry of an integrated circuit that is critical to proper operation of the integrated circuit, while a second CRAM unit 504 may include elements 20 that are used to configure circuitry in datapath circuitry that is less critical to proper functioning integrated circuit. Correspondingly, sub-regions of the floorplan 502 that respectively include the first and second CRAM may be assigned different criticality/priority levels and may be checked for errors at different frequencies based on the assigned criticality/priority levels.

The present invention is generic and applicable to a variety of CRAM implementations, including sector-based implementations, frame-based implementations, and generic column-based implementations (i.e., a monolithic CRAM array without partitioning).

For floorplans 502 that implement a CRAM array using a sector-based partitioning, each CRAM unit 504 may represent a CRAM sector. CRAM sectors may refer to smaller sub-arrays of independently addressable and independently readable sectors. CRAM sectors may each be coupled to an associated local sector manager (LSM) circuit. LSMs may be implemented using processing circuitry, state machines, or any other suitable logic circuitry.

For floorplans 502 that implement a CRAM array using frame-based partitioning, each CRAM unit 504 may represent a CRAM frame. CRAM frames may refer to sub-arrays of a CRAM array that can be accessed and re-written independently of other CRAM arrays. However, each frame may not be provided an associated management circuit as is the case when a sector-based implementation is used.

For floorplans 502 that implement a CRAM array using no particular partitioning (i.e., a column-based CRAM array), each CRAM unit 504 may represent an individual CRAM cell or a fixed-size sub-array of the total CRAM array in floorplan 502.

To simplify the explanation of the present invention, it will be assumed that CRAM units 504 that are related to a configuration of circuitry of a given criticality level (e.g., high criticality, medium criticality, low criticality, etc.) are contained within the CRAM units 504. In other words, any given CRAM unit 504 will be assumed to not contain CRAM cells (i.e., programmable elements 20 used as CRAM bits) that include both high criticality and low criticality bits, but will instead have bits of only a single given criticality level. However, this does not limit the scope of the present invention. Individual CRAM units can include CRAM bits of mixed criticality levels without exceeding the scope of the present invention. When a CRAM unit 504 includes CRAM bits of mixed criticality levels, it may be assumed that the CRAM unit 504 has a criticality level equal to the highest criticality level of its constituent CRAM bits. For example, if a CRAM unit 504 includes low criticality and medium criticality CRAM bits, the CRAM unit 504 may be considered a medium criticality sector (i.e., the higher of the two criticality levels).

In conventional error detection schemes, error detection may uniformly traverse the CRAM units 504 (i.e. in a row-wise or column-wise traversal) to performing error detection on all of the CRAM cells in the floorplan 502. As an example, if the error detection capabilities of an integrated circuit permit three CRAM units 504 to be checked for errors simultaneously (this number being limited by the power delivery capabilities of the power supply provided to the integrated circuit) and the time for error detection on a sector can be performed in 1 millisecond (this number being limited by the read speed of the memory cells in the CRAM units 504 and the system voltage on the integrated circuit), a conventional error detection scheme may involve sequentially checking three CRAM units 504 of a given row/column at a time until all of the CRAM units 504 of the given row/column have been checked. At that point, the next row/column may be checked in the same way.

Assuming, for the sake of illustration, that a CRAM array in a floorplan 502 has a 30 by 30 grid of CRAM units 504, a conventional error detection operation for each row/column may take 10 ms (with the above assumptions), and may take 300 ms for the entire CRAM array. The time it takes for all of the CRAM units 504 in an array to be checked may be referred to as the "frame time" of error detection.

In the present invention, the "frame time" of the entire CRAM array may be lengthened, because particular sub-regions of CRAM units 504 may be checked more often than others.

The CRAM units 504 may include CRAM cells used to configure various logical circuitry in an integrated circuit. In order to specify its function, each functional/logical block in a programmable integrated circuit may be associated with or provided CRAM bits. These bits may supply constant values to the logic, thereby configuring the logic's functions. In the example of a programmable integrated circuit, a first column of sectors may have CRAM units 504 used for configuring control circuitry in the programmable integrated circuit that supervises the functioning of computation or datapath circuitry. The computation or datapath circuitry may be configured using CRAM cells/bits in the remaining sectors of a CRAM array. Generally, control circuitry that is not provided with any redundancy or self-checking mechanisms is considered to be the most critical circuitry on a programmable integrated circuit or at least more critical relative to datapath or computation circuitry.

In many systems, certain portions of the design are more critical than others. Though a single error upset (SEU—a "soft" error) is equally likely to affect in equally sized areas (i.e., equally sized sub-arrays or sectors of a CRAM array), an SEU has greater system impact when it occurs in portions of the CRAM array that sets configuration bits for critical circuitry or logic circuits. Consequently, it would be desirable to check for errors in the CRAM sector that configures the higher criticality logic more frequently than the CRAM sector that configures lower criticality logic circuitry.

FIG. 5 illustrates various critical regions 506 that are associated with portions of the design that are more critical to the proper functioning of the integrated circuit than the non-critical region 508. Each of the critical regions 506 may have an associated weight, W. For example, the first critical region 506-1 may have a first weight $W_1$, the second critical region 506-2 may have a second weight $W_2$, and the third critical region 506-3 may have a third weight $W_3$. The non-critical region 508 may have a fourth weight $W_4$ that may often be set to 1 to serve as a normalized standard to which the weights W of critical regions such as 506 may be set, but may generally have any desired value.

The user interface view 500 may allow a user of computer-aided-design (CAD) software to specify both the size of the critical regions 506 (e.g., the columns and rows bounded by a particular critical region such as the first critical region 506-1) as well as the criticality weights W associated with the critical regions (e.g., the value of weight $W_1$ for the first critical region 506-1). While the user interface view 500 may be used to visually ascertain and graphically select one or more critical regions 506 in the integrated circuit floorplan 502, a dedicated input screen, such as the screen of FIG. 6, may also be used.

Figure 6:
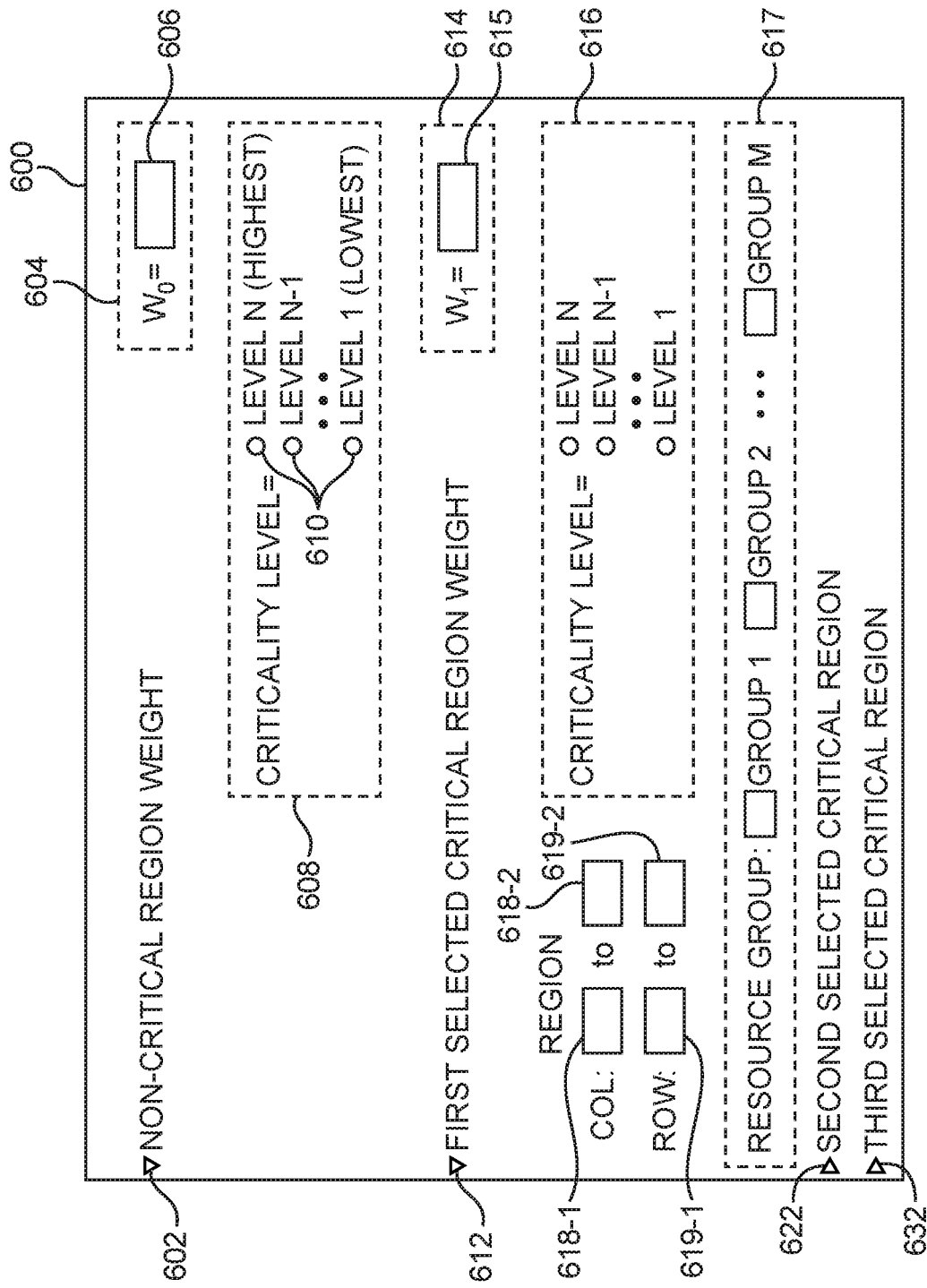
FIG. 6 shows an illustrative screenshot of an input screen for receiving criticality weights for regions of an integrated circuit floorplan using a CAD software in accordance with an embodiment.

FIG. 6 shows an illustrative screenshot of an input screen for receiving criticality weights for regions of an integrated circuit floorplan using a CAD software in accordance with an embodiment. The screenshot of menu 600 may allow a user of computer-aided-design software tools such as the tools 200 of FIG. 2 or the tools 30 of FIG. 3 to assign weights W to selected critical regions 506 and the non-critical region 508. The criticality weight selection menu 602 for the non-critical region 508 may have an optional weight selection menu 604 that includes an input field 606 where a user of CAD software may enter a numerical value to serve as the non-critical region 508 weight in a prioritized error detection schedule. If left empty, this input field 606 may default to the value of 1. In addition to the weight selection menu 604, a rank selection menu 608 for the non-critical region 508 may be provided. The rank selection menu 608 may allow a user of CAD software to assign a criticality rank from N rankings 610 (with rank N being ranked highest and rank 1 being ranked lowest for the purposes of illustration) to the non-critical region 508.

In certain embodiments, the weight selection menu 604 and the rank selection menu 608 may both be included in a menu 600. When both the menus 604 and 608 are included in menu 600, the value input in the input field 606 of the weight selection menu 604 may be tagged/associated with the rank selected in the rank selection menu 608. For example, if a user of CAD tools inputs the value "2" into the input field 606 in the weight selection menu 604 and selects "LEVEL 1 (LOWEST)" in the rank selection menu 608, this association (between the weight of "2" and the rank of "LEVEL 1") may be preserved for subsequent selections in menus for critical regions 506. In other words, if the selection from the above example are made in connection with the menus 604 and 608 for the non-critical region 508, selecting "LEVEL 1" in a rank selection menu for one of the critical regions 506 may automatically be associated with a weight of 2.

In some embodiments, however, only one of the weight selection menu 604 or the rank selection menu 608 may be provided. In embodiments where only the rank selection menu 608 is provided, each of the ranks 510 in the menu 608 may be associated with pre-determined weights. For example, level 1 may have an associated weight of 1, level 2 may have an associated weight of 5, and level N may have an associated weight of $5^{N-1}$. The values for predetermined ranks when only the rank selection menu 608 is provided are merely exemplary and do not serve to limit the scope of the predetermined values associated with each of the ranks 610 in a rank selection menu 608. In general, any predetermined value may be associated with the ranks 610 and may be adjustable by a user through additional menus (not shown in FIG. 6 to avoid obfuscation of the present embodiments).

A criticality weight selection menu 612 may be provided for a first selected critical region such as the first critical region 506-1 of FIG. 5. The menu 612 may include a weight selection menu 614 with a weight input field 615 similar to the menu 604 and input field 606 described above in connection with the non-critical region weight selection menu 602. The value entered into the input field 615 in weight selection menu 614 may determine the weight $W_1$ for the first critical region 506-1 of FIG. 5, as an example. The value entered into the input field 615 may be associated with a selected criticality level from the rank selection menu 616 in embodiments where both the weight selection menu 614 and the rank selection menu 616 are both provided. In embodiments where only the rank selection menu 616 is provided, each of the ranks may have associated predetermined weights (as described above in connection with rank selection menu 608).

Region specification fields 618 and 619 are also included in the first critical region menu 612. A user of CAD software may, in the view 500 of FIG. 5, for example, manipulate a cursor to select a region bounded by a column range and a row range and designate the selected region as a critical region. When a cursor is used to select and designate such a region, the column range and row range of the selection may be automatically populated in the input fields 618 and 619 of menu 612, respectively. These automatically populated values in the fields 618 and 619 may be adjusted to compensate for errors in the cursor-based selection in view 500.

Alternatively, when the view 500 is not used to select a critical region, a user may manually specify a starting row of the critical region in the input field 618-1 and an ending row of the critical region in the input field 618-2. Similarly, a starting column of the critical region may be specified in the input field 619-1 and an ending column of the critical region may be specified in the input field 619-2.

An optional device resource group selection menu 617 may also be provided. The selection menu 617 may allow users to associate the critical region specified in the input fields 618 and 619 with one of M user-defined device resource groups. As an example, one of the M user-defined device resource groups may be control circuitry, while another one of the M user-defined device resource groups may be datapath circuitry. When the device resource group selection menu 617 is provided with either or both of the weight selection menu 614 and the rank selection menu 616, the weight/rank specified in the menus 614/616 may be associated with the selected device resource group selected in the menu 617. As an example, if the value entered in the input field 615 of the weight selection menu 614 is 100 and/or the rank selected in the rank selection menu 616 is level N, selecting device group 1 in the menu 617 would automatically set the criticality weight of any subsequent critical regions identified as group 1 to 100 or the predetermined weight associated with level N.

In some embodiments, only the resource group selection menu 617 may be provided. In such embodiments, each of the device resource groups in menu 617 may have an associated predetermined criticality rank/weight (similar to the predetermined weights based on criticality rank described above in connection with the menus 608 and 616). As an example, selecting device resource group 1 for the first selected critical region may set the criticality weight $W_1$ to 10, while selecting device resource group 2 for the first selected critical region may set the criticality weight $W_1$ to 100.

Additional menus 622 and 632 may be available for specifying additional second and third critical regions such as the regions 506-2 and 506-3, respectively. Generally, any number of critical region menus may be available and may have similar menu options to those described above in connection with the first selected critical region menu 612.

After a user has finished specifying criticality weights W, criticality ranks, and/or device resource group types for the desired number of critical regions, a basic prioritized error detection schedule may be generated. FIG. 7 is a table illustrating an exemplary basic prioritized error detection schedule in accordance with an embodiment.

The basic prioritized error detection schedule 700 may be generated based on the weights W for the critical regions and non-critical region specified using the menu 600 of FIG. 6. The basic prioritized error detection schedule is an indexed list of sub-regions of an integrated circuit floorplan such as the floorplan 502 illustrated by the view 500 of FIG. 5 to be checked for errors. During operation of an integrated circuit, the indexed list may be sequentially traversed and sub-regions of the integrated circuit associated with a given index will be checked for errors before the index is incremented.

In the interest of simplifying the present explanation/illustration of how a basic prioritized error detection schedule 700 may be generated, it will be assumed that there are only three identified critical regions. However, this does not serve to limit the scope of the present invention. In general, any number of critical regions may be identified by a user of the CAD software tools.

In the basic prioritized error detection schedule 700 illustrated in FIG. 7, the number of indices may be the sum of all of the weights of the critical regions (i.e., $W_0+W_1+W_2+W_3$ in the present example). For the sake of simplifying the following description of the proportion of indices that are devoted to checking each of the critical regions, $W_T$ will be used to denote the sum of all of the weights of the critical regions (i.e., $W_T=W_0+W_1+W_2+W_3$ in the present example).

According to the basic prioritized error detection schedule shown in FIG. 7, the first $W_1$ indices (i.e., indices 1 through $W_1$) of the $W_T$ indices in the schedule 700 prescribe error detection operations in critical region 1 (such as region 506-1 in the exemplary floorplan of FIG. 5). Following the first $W_1$ indices, $W_2$ indices (i.e., indices $W_1+1$ through $W_1+W_2$) of the schedule 700 prescribe error detection operation in critical region 2 (such as region 506-2 in the exemplary floorplan of FIG. 5). Following the first $W_1+W_2$ indices, $W_3$ indices (i.e., indices $W_1+W_2+1$ through $W_1+W_2+W_3$) of the schedule 700 prescribe error detection operations in critical region 3 (such as region 506-3 in the exemplary floorplan of FIG. 5). Finally, after the three critical regions have been checked (i.e., after $W_1+W_2+W_3$ indices), the non-critical region may be checked starting from the index $W_1+W_2+W_3+1$ until $W_1+W_2+W_3+W_0$. If the weight $W_0$ is set to 1, then only a single index of the schedule 700 (i.e., index $W_1+W_2+W_3+1$) may prescribe error detection operations in the non-critical region.

As described above, the example of FIG. 7 assumes three designated critical regions. However, any number of critical regions may be designated using CAD software tools using the menus of FIGS. 5 and 6. Consequently, a generalized description of the construction of a prioritized error detection schedule may be as follows: each of the "N" critical regions of an integrated circuit floorplan may have an associated weight $W_i$ and a non-critical region of the integrated circuit floorplan may have an associated weight $W_0$-a prioritized error detection schedule with $W_T$ indices may prescribe $W_i$ of the $W_T$ indices to checking the i-th critical region for errors, and $W_0$ of the $W_T$ indices may be used to prescribe error detection in the non-critical region. Consequently, the proportion of indices $W_i/W_T$ dedicated to checking a given i-th critical region (where $W_T$ is the sum of $W_i$ for values of i ranging from 0 to N) may be proportional to the weight $W_i$ associated with the given critical region.

The above generalized description of the contents of a prioritized error detection schedule is notable in being generic to any ordering of the indices since it characterizes the prioritized schedule with reference to the number/proportion of indices that prescribe error detection operations in a given sector i of the N critical regions. The exemplary basic prioritized schedule 700 of FIG. 7 has the critical regions checked in order (from 1 to N, where N is 3) based on the indices—however, this is not necessary. As long as the proportion of indices used to prescribe error detection in a given i-th sector of the N sectors (i.e., $W_i/W_T$) is maintained, a schedule in which sectors may be checked in any order may be formulated. Varying the order in which the sectors are checked for errors relative to the basic schedule 700 may be referred to as interleaving.

FIG. 8 is a table illustrating an exemplary interleaved version of a basic prioritized error detection schedule in accordance with an embodiment. To simplify the illustration of interleaving the error detection prescriptions relative to the basic schedule 700 of FIG. 7, the schedule 800 assumes three critical regions (as was assumed in connection with the schedule of FIG. 7), as well as some of the weights for the critical regions. Specifically, the weight $W_1$ for the first critical region is assumed to be 100, the weight $W_2$ for the second critical region is assumed to be 60, the weight $W_3$ for the third critical region is assumed to be 20, and the weight $W_0$ for the non-critical region is assumed to be 1.

In the example of FIG. 8, the proportion of indices used to prescribe error detection in a given sector of the N sectors is the same as it would be in the basic schedule 700 of FIG. 7. In other words, the proportion of the total number of indices $W_T$ that prescribe error detection for a given sector i is still $W_i/W_T$. However, unlike FIG. 7, in which the indices prescribing error detection for a given sector are sequential (e.g., critical region 1 is checked in sequential indices 1 through $W_1$), the indices prescribing error detection for a given critical sector of the three critical sectors in FIG. 8 are non-sequential.

For example, critical region 1, which has an associated weight $W_1$ of 100, is checked in indices 1 through 50 as well as 91 through 140. Generally, the $W_1$ indices in the schedule that specify error correction in critical region 1 may be distributed throughout the total $W_T$ indices of an interleaved schedule 800 in any desired way, as long as the total indices that specify error correction in critical region 1 remain the same (i.e., $W_1$ number of indices). While the indices used to prescribe error detection in critical region 1 are not sequential, the total number of indices used to prescribe error detection in critical region 1 is 100 (which is the value of $W_1$)—meaning the proportion of indices used to specify error detection in critical region 1 to the total number of indices is the same as it would be in a basic schedule 700 shown in FIG. 7.

After the first 50 indices (indices 1 through 50) that prescribe error detection in critical region 1, 30 indices (indices 51 through 80) may specify error detection in critical region 2. Since the criticality weight $W_2$ associated with critical region 2 is 60, 30 additional indices specifying error detection in critical region 2 that are not sequential with indices 51 through 80 are included in indices 141-170. The total number of indices that prescribe error detection in critical region 2 is therefore equal to $W_2$. Generally, the $W_2$ indices in the schedule that specify error correction in critical region 2 may be distributed throughout the total $W_T$ indices of an interleaved schedule 800 in any desired way, as long as the total indices that specify error correction in critical region 2 remain the same (i.e., $W_2$ number of indices).

After the first 30 indices (indices 51-80) that prescribe error detection in critical region 2, 10 indices (indices 81 through 90) may specify error detection in critical region 3. Since the criticality weight $W_3$ associated with critical region 3 is 20, 10 additional indices specifying error detection in critical region 3 that are not sequential with indices 81 through 90 are included in indices 171-180. The total number of indices that prescribe error detection in critical region 3 is therefore equal to $W_3$. Generally, the $W_3$ indices in the schedule that specify error correction in critical region 3 may be distributed throughout the total $W_T$ indices of an interleaved schedule 800 in any desired way, as long as the total indices that specify error correction in critical region 3 remain the same (i.e., $W_3$ number of indices).

Finally, the last index of the interleaved schedule 800 of FIG. 8 is an index prescribing error detection in the non-critical region of the integrated circuit floorplan (such as the region 508 of FIG. 5). Since the criticality weight $W_0$ for the non-critical region is equal to 1, only a single index is required for specifying error detection in the non-critical region. Generally, the $W_0$ index or indices specifying error correction in the non-critical region can be placed or distributed in the total $W_T$ indices of an interleaved schedule 800 in any desired way as long as the total number of indices that specify error correction in the non-critical region remain the same (i.e., $W_0$ number of indices).

Figure 9:
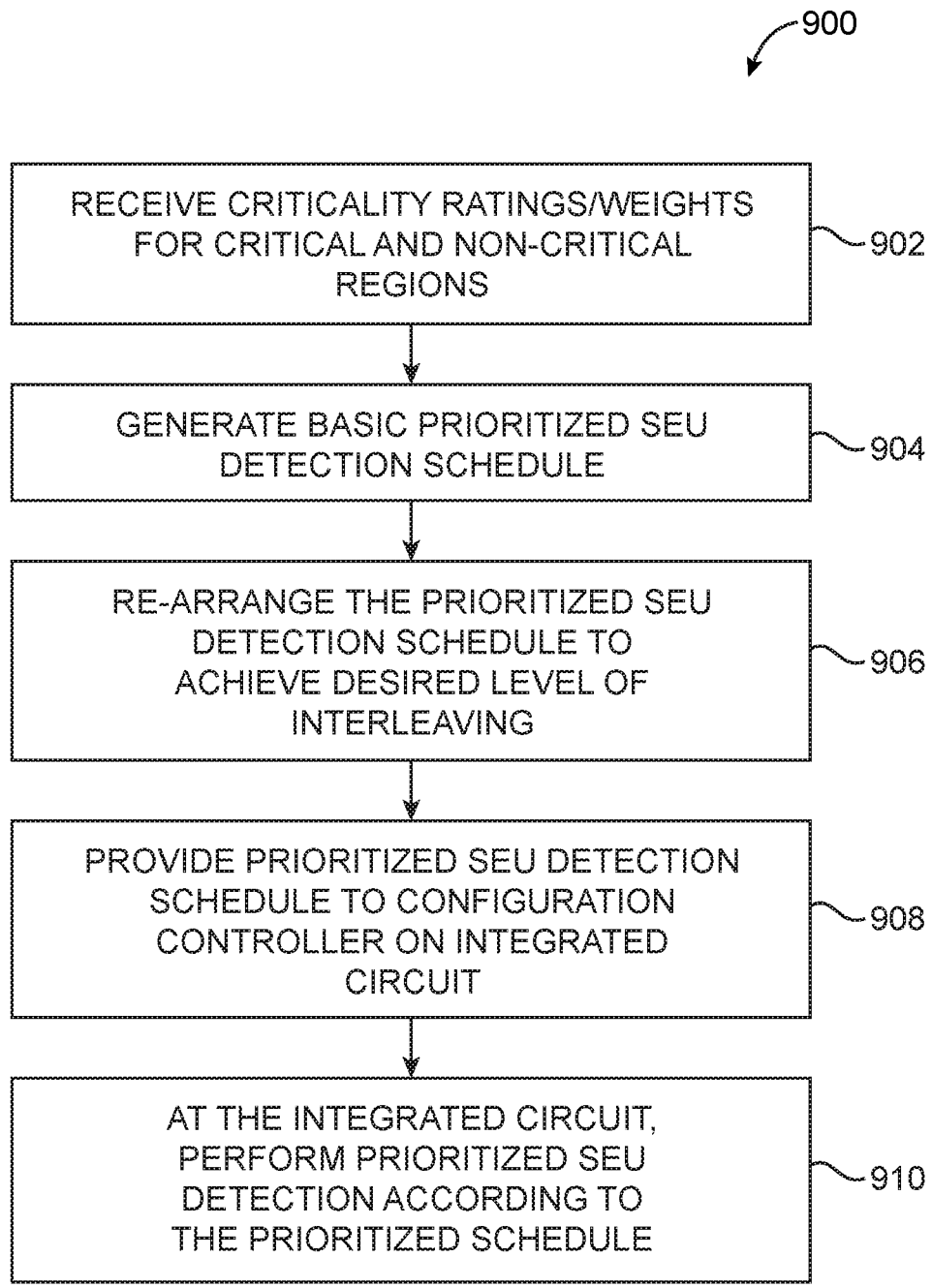
FIG. 9 is a simplified flowchart of steps for receiving criticality weights for regions of an integrated circuit, generating a corresponding prioritized error detection schedule, and performing prioritized error detection in accordance with an embodiment.

FIG. 9 is a simplified flowchart of steps for receiving criticality weights for regions of an integrated circuit, generating a corresponding prioritized error detection schedule, and performing prioritized error detection in accordance with an embodiment. The method 900 describes steps that may be performed at the CAD software tools used to design and configure an integrated circuit as well as steps that may be performed by the configured integrated circuit during normal operation.

At step 902 of FIG. 9, criticality ratings and/or weights for specified critical and non-critical regions of an integrated circuit floorplan may be received at CAD software tools. As described in connection with FIGS. 5 and 6, the physical location/span of each of the regions may be specified graphically by selecting regions on a graphical display of a view of an integrated circuit floorplan 502.

At step 904, a basic prioritized SEU detection schedule may be created. The creation of a prioritized error detection schedule in step 904 may refer to creating a basic prioritized error detection schedule such as the schedule shown in FIG. 7, where each critical region has a number of indices corresponding to (or equal to) a criticality weight (i.e., the weights received in step 902) assigned to the critical region. Generally, for any i-th critical region, the number of indices in a basic prioritized error detection schedule may be $W_i$—the criticality weight received for the i-th critical region. The total number of indices in a basic prioritized error detection schedule may be equal to $W_T$, the sum of all of the weights $W_i$ for the designated critical regions and the weight $W_O$ for a non-critical region of an integrated circuit floorplan.

As discussed above in connection with FIGS. 7 and 8, a basic prioritized error detection schedule may be characterized by having all of the indices prescribing error detection for a given critical region being sequential. At step 906 the basic prioritized error detection schedule may be re-arranged to achieve a desired level of interleaving. A shown in FIG. 8, a basic prioritized error detection schedule may be re-arranged such that indices prescribing error detection for a given critical region being sequential are not all sequential. As an example, if a i-th critical region has a weight $W_i$ equal to 50, the 50 sequential indices prescribing error detection for the i-th critical region in the prioritized schedule generated in step 904 may be re-arranged so that the first 25 indices of an interleaved prioritized error detection prescribe error detection for the i-th critical region and the last 25 indices of an interleaved prioritized error detection prescribe error detection for the i-th critical region.

Generally, the desired level of interleaving may be specified by receiving user input, at CAD software tools for a maximum number of sequential indices for a given sector. As an example, CAD software tools may receive inputs specifying that no more than M indices prescribing error detection for an i-th critical region should be sequential. Step 906 of FIG. 9 is optional and may be omitted if no interleaving is desired.

At step 908, the interleaved prioritized error detection schedule generated at step 906 or the basic prioritized error detection schedule generated at step 904 (if step 906 is skipped), may be provided from the CAD software tools to an integrated circuit via a configuration bitstream.

At step 910, the integrated circuit may perform prioritized error detection according to the prioritized error detection schedule received in step 908. To perform prioritized error detection according to the schedule, the indices of the prioritized error detection schedule may be sequentially traversed. In other words, the region specified by index 1 may be checked for errors and then the index may be incremented, and the region specified by index 2 may be checked for errors, and so on.

Figure 10:
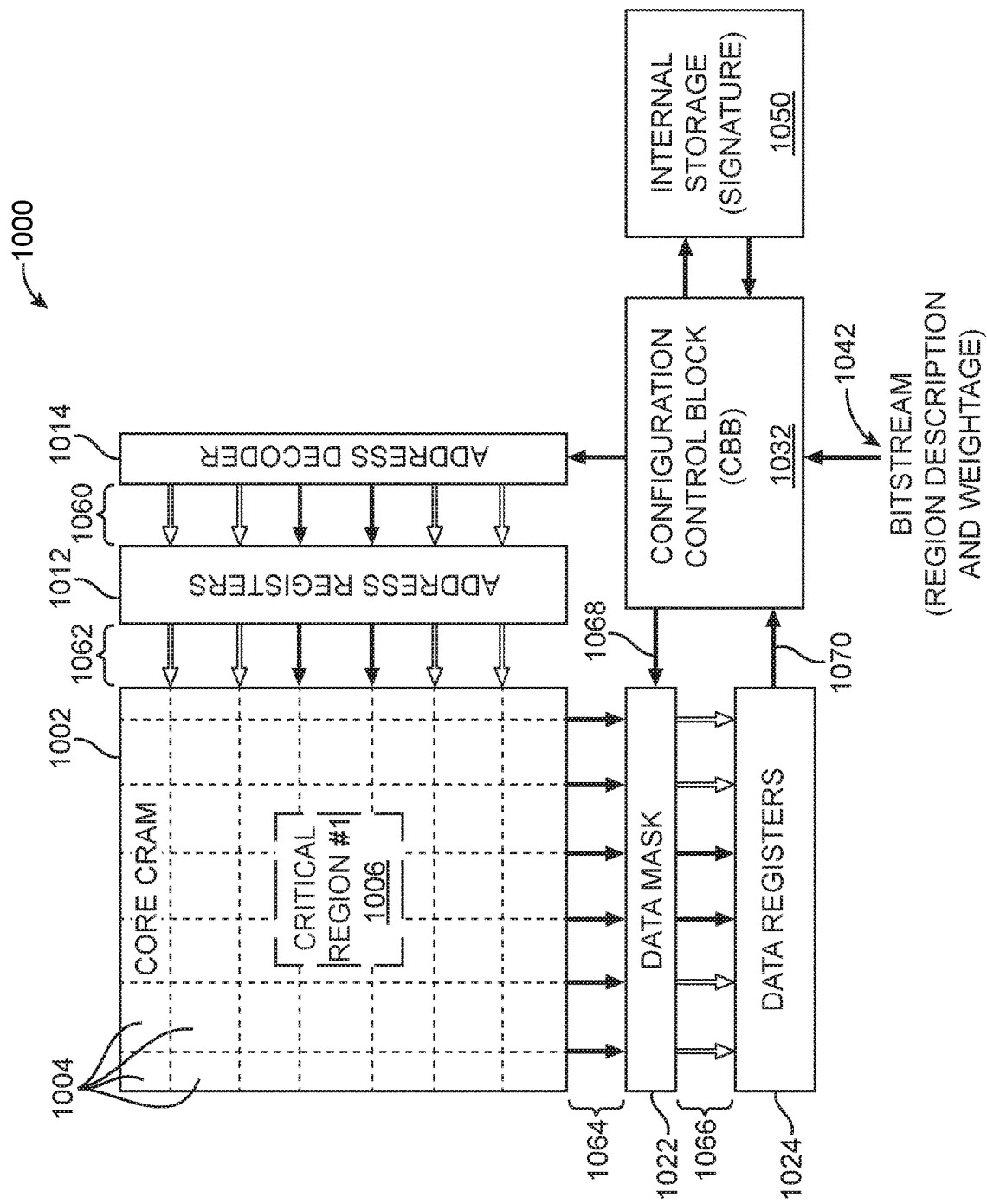
FIG. 10 is a diagram of an exemplary integrated circuit used to perform prioritized error detection in accordance with an embodiment.

FIG. 10 is a diagram of an exemplary integrated circuit used to perform prioritized error detection in accordance with an embodiment. The integrated circuit 1000 may be similar to the integrated circuit 10 described in connection with FIG. 1. The core CRAM region 1002 may correspond to the floorplan 502 in connection with FIG. 5 and may include an array of CRAM units 1004 similar to the CRAM units 504 described in connection with FIG. 5. A configuration control block (CCB) 1032 may receive a configuration bitstream 1042 from CAD software tools during configuration of the integrated circuit 1000. The configuration bitstream 1042 may include configuration values to load into the CRAM units 1004 in the core CRAM region 1002, as well as region descriptions (i.e., specifications of the rows and columns of the core CRAM region 1002 that each of the critical regions span) and weightage (i.e., the criticality ratings/weights $W_i$ for the critical regions and the weight $W_O$ for the non-critical region).

Configuration bitstream may also receive error detection signatures (i.e., CRC results, syndromes, parity values) for the various CRAM units 1004. These error detection signatures may be stored in internal storage 1050 and be used to check against error detection results based on data stored in the CRAM units 1004 checked for errors.

Figure 11:
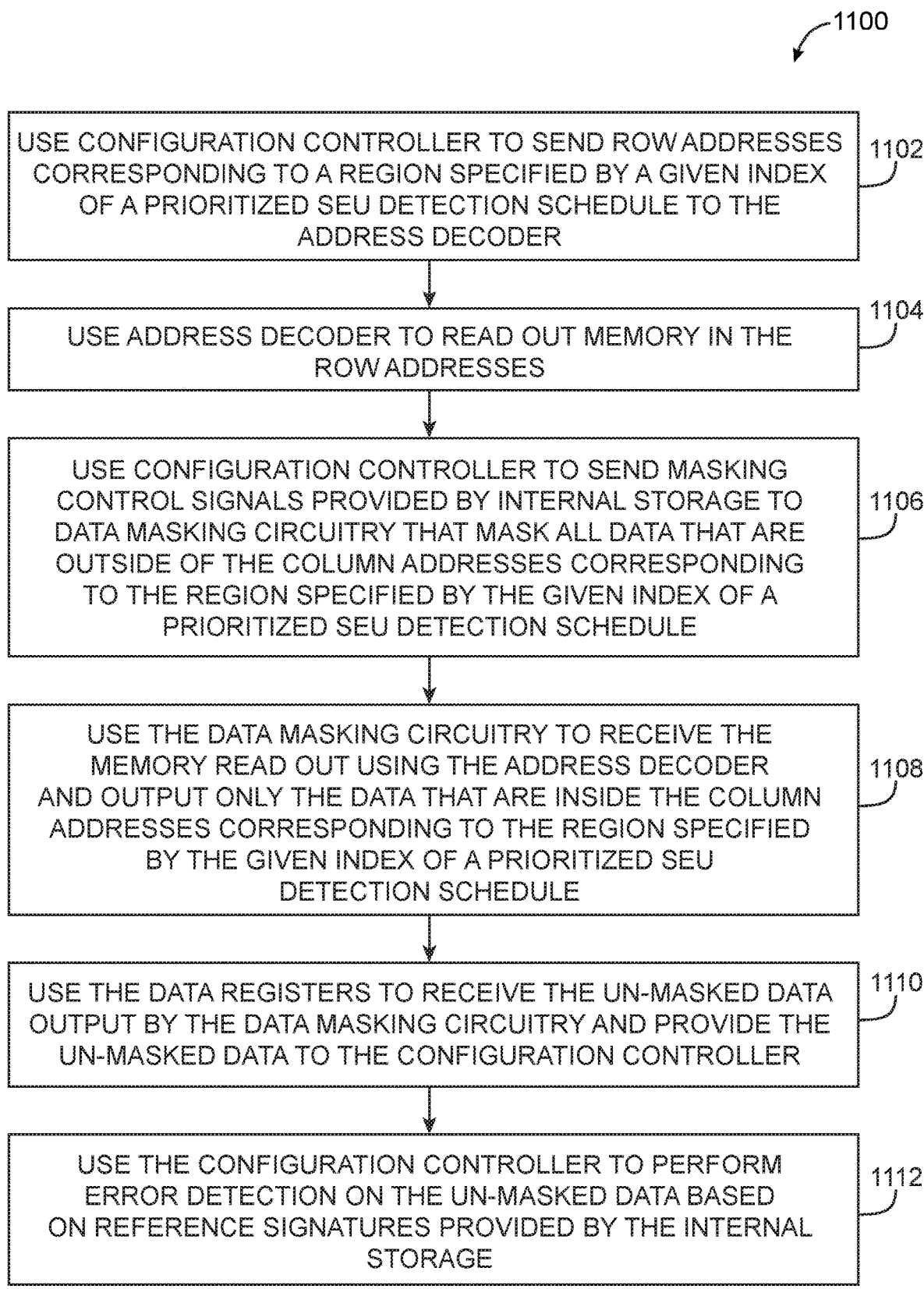
FIG. 11 is a simplified flowchart of steps for performing prioritized error detection using an integrated circuit in accordance with an embodiment.

FIG. 11 is a simplified flowchart of steps for performing prioritized error detection using an integrated circuit in accordance with an embodiment.

At step 1102 of method 1100, CCB 1032 may provide address data for a sub-region of the core CRAM region to be checked for errors. The address data may correspond to a critical region or a non-critical region based on the specification of the current index of the prioritized error detection schedule. Row address data for the rows of a given critical region to be checked may be provided to address decoder 1014 by CCB 1032.

At step 1104, address decoder 1014 may decode the received address signals. Address registers 1012 may receive decoded address signals 1060 from the address decoder 1014. The decoded address signals may comprise asserted readout signals for the rows that the critical region to be checked for errors spans (the asserted signals being indicated by the bolded arrows in the signals 1060). The control signals received at the address registers 1012 may be relayed to the core CRAM region 1002 via signals 1062 to activate read out circuitry in the CRAM rows corresponding to the rows that the critical region to be checked for errors spans. In the example of FIG. 10, the rows that critical region 1006 spans are asserted (as indicated by the bolded control signal arrows in the signals 1062).

At step 1106, the CCB 1032 may be used to send masking control signals 1068 provided by the internal storage (based on the stored region descriptions of the critical regions). These signals may indicate to the data masking circuit 1022 to mask (or prevent propagation of) some of the output signals 1064 from the CRAM region 1002. The output signals 1064 may be signals from entire rows of CRAM units 1004 that correspond to the rows spanned by the critical region being checked for errors. The masking control signals 1068 may specify which of the columns of the output signals 1064 should be propagated by specifying that all data that are outside of the columns spanned by the critical region (i.e. the critical region specified by the current index of the prioritized error detection schedule) should be masked.

At step 1108, the data masking circuitry 1022 may receive the output signals 1064 and mask (or prevent propagation of) all of the output signals outside of the columns spanned by the critical region specified by the current index of the prioritized error detection schedule. In the example of FIG. 10, it is shown that only the output signals 1064 corresponding to the columns spanned by the critical region 1006 are output in the masked output signals 1066 (as indicated by the bolded arrows in signals 1066). Output signals 1064 corresponding to the columns outside of the columns spanned by the critical region 1006 are masked in the masked output signals 1066 (as indicated by the non-bolded arrows in signals 1066).

At step 1024, data registers 1024 may receive the unmasked data, the data that was propagated by the data mask circuitry 1022. This un-masked data may correspond to CRAM data from within the rows and columns spanned by the critical region specified by the current index of the prioritized error detection schedule. These relayed CRAM data signals 1070 may be received at the CCB 1032.

At step 1112, the CCB 1032 may be used to perform error detection on the un-masked CRAM data signals 1070 received from the data registers. Any suitable error detection scheme may be used, including (but not limited to) parity bit detection, checksums, cyclic redundancy checks (CRCs), hash functions, error-correcting codes (ECCs), or error syndrome computation/measurement. Reference signatures for the error detection method used by the CCB 1032 may be stored in internal storage 1050. These stored reference signatures may be compared the generated error signature based on the received un-masked CRAM data signals 1070. If an error is detected, the type of corrective action taken may depend on the criticality of the region in which the error was detected. In some embodiments, errors in less critical regions may be ignored or corrected only after a predetermined threshold number of errors have accumulated, while errors in more critical regions may be corrected immediately.

Following step 1112, the index of the prioritized error detection schedule may be incremented and the steps of method 1100 may be repeated based on the address information for the critical specified by the next index in the prioritized error detection schedule.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for performing prioritized error detection on an array of memory cells used in an integrated circuit, the method comprising: at a configuration circuit, receiving a prioritized error detection schedule that prescribes different numbers of error detection operations for respective sub-regions of the array of memory cells; and
    with an error detection circuitry, performing prioritized error detection on the array of memory cells based on the prioritized error detection schedule.

2. The method defined in claim 1, further comprising: at computer-aided-design (CAD) tools, designating sub-regions of the array of memory cells in the integrated circuit as critical regions; and at the CAD tools, assigning criticality ratings to each of the designated sub-regions of the array of memory cells.

3. The method defined in claim 2, further comprising:
    at the CAD tools, assigning an additional criticality rating to a non-critical region of the integrated circuit.

4. The method defined in claim 2, wherein designating the sub-regions of the array of memory cells in the integrated circuit as critical regions comprises: receiving a graphical selection of at least one of the sub-regions from a floorplan view of the integrated circuit.

5. The method defined in claim 2, wherein designating the sub-regions of the array of memory cells in the integrated circuit as critical regions comprises; receiving a row range for a first one of the sub-regions; and receiving a column range for the first one of the sub-regions.

6. The method defined in claim 2, wherein assigning the criticality ratings to each of the designated sub-regions of the array of memory cells comprises: receiving a first criticality weight for a first one of the sub-regions; and receiving a second criticality weight that is different from the first criticality weight for a second one of the sub-regions.

7. The method defined in claim 2, wherein assigning the criticality ratings to each of the designated sub-regions of the array of memory cells comprises:
    receiving a first criticality level for a first one of the sub-regions; receiving a second criticality level for a second one of the sub-regions; and determining respective first and second criticality weights for the first and second criticality levels.

8. The method defined in claim 2, further comprising:
    at the CAD tools, generating the prioritized error detection schedule based on the assigned criticality ratings; and
    transmitting the prioritized error detection schedule to the integrated circuit using a configuration bitstream.

9. The method defined in claim 8, wherein the criticality ratings comprise criticality weights, and wherein generating the prioritized error detection schedule comprises:
    creating the prioritized error detection schedule with a number of indices equal to a sum of the criticality weights and a sum of an additional criticality weight for a non-critical region of the integrated circuit.

10. The method defined in claim 9, wherein generating the prioritized error detection schedule further comprises: assigning a first one of the sub-regions of the array of memory cells to a first proportion of the number of indices, wherein the first proportion is based on a first criticality weight associated with the criticality rating for the first one of the sub-regions of the array of memory cells; and assigning second one of the sub regions of the memory cells to a second proportion of the number of indices, wherein the second proportion is based on a second criticality weight associated with the criticality rating for the second one of the sub-regions of the array of memory cells.

11. The method defined in claim 10, wherein assigning the first one of the sub-regions of the array of memory cells to the first proportion of the number of indices comprises: assigning the first one of the sub-regions to sequential indices in the prioritized error detection schedule.

12. The method defined in claim 10, wherein assigning the first one of the sub-regions of the array of memory cells to the first proportion of the number of indices comprises: assigning the first one of the sub-regions to non-sequential indices in the prioritized error detection schedule.

13. The method defined in claim 1, wherein performing the prioritized error detection on the array of memory cells comprises: performing error detection on the sub-regions of the array of memory cells by traversing an indexed list of the sub-regions, wherein the indexed list of the sub-regions comprises at least one index associated with a non-critical region of the integrated circuit.

14. The method defined in claim 13, wherein traversing the indexed list of the sub-regions comprises:
    checking a first sub-region associated with a first index of the prioritized error detection schedule for errors; and
    after checking the first sub-region associated with the first index of the prioritized error detection schedule for errors, checking a second sub-region associated with a second index of the prioritized error detection schedule for errors.

15. An integrated circuit, comprising:
a core region comprising an array of configuration memory cells having a plurality of critical sub-regions; and
control circuitry that receives a prioritized error detection schedule, wherein the control circuitry performs prioritized error detection on the core region of the integrated circuit by checking each of the critical sub-regions for errors a respective number of times, and wherein the number of times any given one of the critical sub-regions is checked for errors is prescribed by the prioritized error detection schedule.

16. The integrated circuit of claim 15, wherein the prioritized error detection schedule comprises an indexed list of the critical sub-regions, further comprising:
addressing circuitry coupled to the core region, wherein the addressing circuitry receives addresses of a first subset of rows in the array of configuration memory cells spanned by a first one of the critical sub-regions associated with a given index in the prioritized error detection schedule, and reads out data from the first subset of the rows in the array of configuration memory cells.

17. The integrated circuit of claim 16, further comprising: data masking circuitry that receives the data read out from the first subset of the rows in the array of configuration memory cells and that also receives a data masking signal from the control circuitry, wherein the data masking circuitry outputs a subset of the data read out from the first subset of the rows in the array of configuration memory cells that is contained within a first subset of columns spanned by the first one of the critical sub-regions, and wherein the control circuitry receives the subset of the data from the data masking circuitry and checks the subset of data for errors.

18. A method of performing prioritized error detection on an array of memory cells used in an integrated circuit, the method comprising:
at control circuitry, receiving a prioritized error detection schedule;
at the control circuitry, transmitting addressing information for a critical region of the array of memory cells corresponding to a given index of the prioritized error detection schedule;
with readout circuitry, outputting data from the critical region of the array of memory cells corresponding to the given index of the prioritized error detection schedule to the control circuitry; and
at the control circuitry, checking the data from the critical region of the array of memory cells corresponding to the given index of the prioritized error detection schedule for errors.

19. The method defined in claim 18, wherein transmitting the addressing information comprises:
providing row address information for the critical region to addressing circuitry coupled to rows of the array of memory cells; and
providing column address information for the critical region to data masking circuitry coupled to columns of the array of memory cells.

20. The method defined in claim 18, further comprising:
after checking the data from the critical region of the array of memory cells corresponding to the given index of the prioritized error detection schedule for errors, checking another critical region of the array of memory cells corresponding to a subsequent index to the given index of the prioritized error detection schedule for errors.

* * * * *